Sept. 28, 1937.　　　　F. D. BUTLER　　　　2,093,997
CRANK BEARING ASSEMBLY
Filed Nov. 4, 1931　　　　2 Sheets-Sheet 1
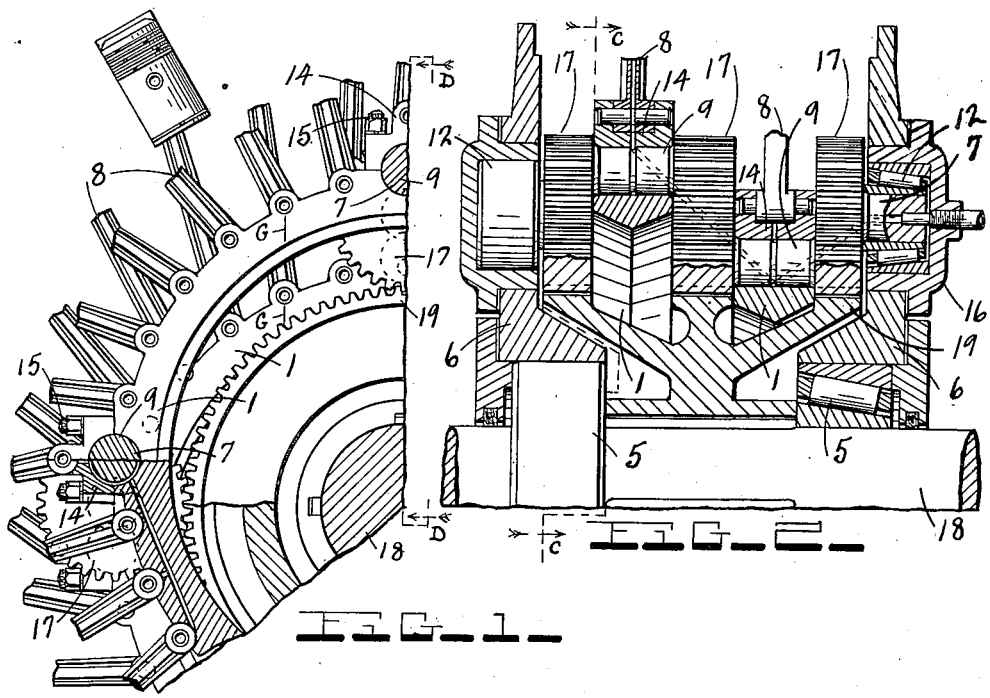
INVENTOR
Frank David Butler
BY
Robert A. Lavender
ATTORNEY Sept. 28, 1937.  F. D. BUTLER  2,093,997
CRANK BEARING ASSEMBLY
Filed Nov. 4, 1931  2 Sheets-Sheet 2
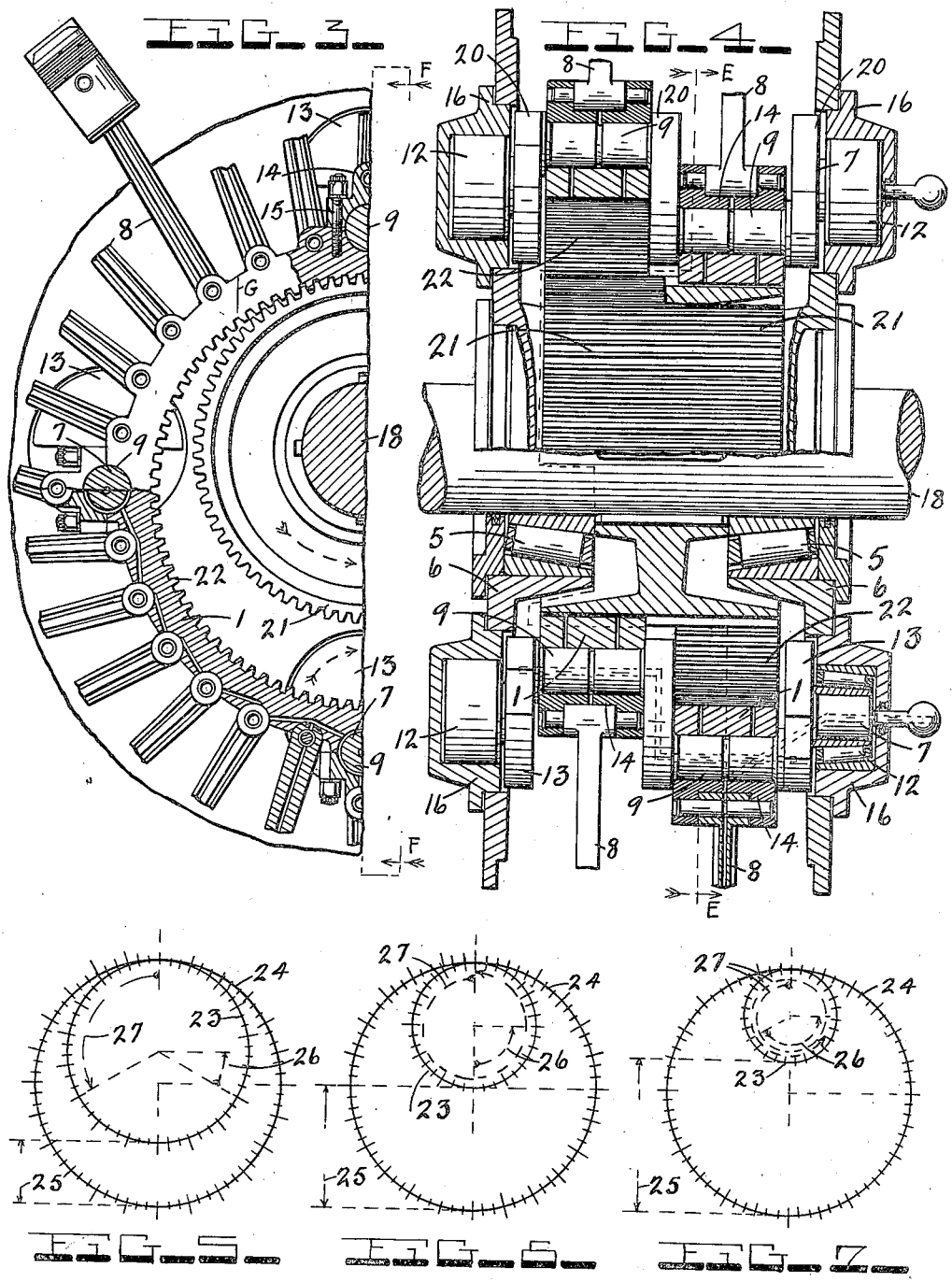
INVENTOR
Frank David Butler
BY
Robert A. Lorender
ATTORNEY Patented Sept. 28, 1937

2,093,997

UNITED STATES PATENT OFFICE 2,093,997

CRANK BEARING ASSEMBLY

Frank David Butler, United States Navy, Bremerton, Wash.

Application November 4, 1931, Serial No. 573,011

15 Claims. (Cl. 121—120)

(Granted under the act of March 3, 1883, as amended April 30, 1928; 370 O. G. 757)

My invention relates particularly to engines of the radial type wherein the connecting rods are disposed about a common main shaft and wherein the feet of said connecting rods are oscillatably mounted in the periphery of a mother crank bearing ring which latter is adapted to enclose and to be mounted eccentric with said main shaft, and the objects of my invention are: First, to provide means in the form of a plurality of auxiliary crank shafts for the combined purpose of guiding said mother crank bearing ring in a path of travel concentric with the axis of said main shaft, and placing the engine pistons on their respective dead centers at the proper rotative interval of crank shaft travel; second, to provide said mother crank bearing ring adaptable to the crank pins of said auxiliary crank shafts; third, to provide means in combination with said mother crank bearing ring and said auxiliary crank shafts for the purpose of either reducing or increasing the rotative speed of the main shaft in relation to the rotative speed of said auxiliary crank shafts; fourth, to provide means for counterbalancing each of the bearing rings and auxiliary crank shafts; and fifth, to produce a structure which is exceedingly simple in construction, efficient in operation, durable in use, and especially adaptable to large engines of the type mentioned.

To the accomplishment of the foregoing and such other objects as may hereinafter appear, my invention consists in the combination, arrangement and construction of parts hereinafter described, pointed out in the appended claims and illustrated in the accompanying drawings forming a part hereof, it being understood that various changes may be made in practice within the scope of the claims, without digressing from my inventive idea or sacrificing any of the advantages disclosed in the invention.

Three of the many possible embodiments of my invention are illustrated in the accompanying drawings, in which Fig. 1 is a broken-away end elevation and transverse section of a portion of Fig. 2 as taken on the dotted and broken line C—C of the latter and illustrates a second type of embodiment of my invention by combining a plurality of auxiliary crank shafts having gear portions integral therewith with a gear mounted on the main shaft for rotative speed changing transmission purposes;

Fig. 2 is a longitudinal section of Fig. 1 as taken on the dotted and broken line D—D of the latter, with the exception that a few of the parts of the assembly are illustrated in side elevation;

Fig. 3 is a broken-away end elevation and transverse section of a portion of Fig. 4 as taken on the dotted and broken line E—E of the latter and illustrates a third type of embodiment of my invention by combining a plurality of auxiliary crank shafts, a plurality of mother crank bearing rings having gear portions integral therewith, and a gear mounted on the main shaft for rotative speed changing transmission purposes;

Fig. 4 is a longitudinal section of Fig. 3 as taken on the dotted and broken line F—F of the latter, with the exception that a few of the parts of the assembly are illustrated in side elevation;

And Figs. 5, 6 and 7 are diagrammatic illustrations of the different types used for obtaining the desired speed change of the assembly embodiment illustrated in Figs. 3 and 4 inclusive.

With reference to the symbols of the drawings, similar numerals represent and indicate similar parts in the several views, and with reference to Figs. 1 and 2 inclusive, the construction and operation of the first embodiment illustrated is as follows:

In this embodiment, each of the mother crank bearing rings 1 that may be employed in the engine is supported entirely on the crank pins 9 of the auxiliary crank shafts 7, and the entire assembly is constructed and arranged so as to further produce a reduction gear transmission in addition to the other novel features of the invention. Each of the auxiliary crank shafts 7 of this embodiment consists of, a plurality of crank pins 9 which are adapted to be journalled in the crank bearing cavities in the rings 1 and the crank bearing caps 14 which latter are secured to the rings 1 by the stud bolts 15, a plurality of main journal portions fitting the bearings 12 which latter are secured in the bearing housings 16 which are in turn disposed in the crank case housings 6, and a plurality of crank webs 17 which are circular (in this instance) and concentric with said main journal portions and utilized as a pinion reduction gear meshing with the master or bull reduction gear 19 for power transmission purposes intermediate the pistons and the main shaft 18. In this and the succeeding embodiment the main shaft 18 replaces the usual crank shaft. The gear 19 is mounted on and secured to operate with said shaft 18 and the latter is journaled in the bearings 5 which are in turn suitably disposed in the crank case heads 6. Each of the pair of mother crank bearing rings 1 of this embodiment consists of, an annular shaped main body portion which is adapted to be supported on and guided by a plurality (preferably four) of equally spaced auxiliary crank shafts 7, and numerous foot end wrist pin joints adaptable to the connecting rods 8. In this instance the multiple piston thrusts are transmitted to rotate the main shaft 18 through the rings 1 which latter are adapted to be supported on the crank pins 9 of the auxiliary crank shafts 7 and to be guided (by said crank pins) in a circle about and concentric with said main shaft, and to convey said piston thrusts to said main shaft via said auxiliary crank shafts 7, the crank webs of which latter are formed into and act in the capacity of pinion gears in rotating the bull reduction gear 19 secured to said main shaft. The relative size of the pinion gear portions of the crank shafts 7, as compared with the size of the bull reduction gear 19 (as illustrated, Figs. 1 and 2), is such, in this particular instance, as to produce a three to one reduction ratio, that is, the shafts 7 would rotate at three times the speed of the main shaft 18.

With reference to Figs. 3 and 4 inclusive, the construction and operation of the third embodiment illustrated therein, is as follows:

In this latter embodiment, similar to the second embodiment just described, the entire assembly is so constructed and arranged as to also produce a reduction gear transmission in addition to the other novel features of the invention. Each of the auxiliary crank shafts 7 of this latter embodiment consists of, a plurality of crank pins 9 which are adapted to be journaled in the crank bearing cavities in the rings 1 and the crank bearing caps 14 which latter are secured to the rings 1 by the stud bolts 15, a plurality of main journal portions fitting the bearings 12 which latter are secured in the bearing housings 16 which are in turn disposed in the crank case housings 6, and a plurality of crank webs or discs 20 provided for rigidly connecting said crank pins and said main journal portions, also being formed or shaped so as to counterweigh and form a means of counterbalancing said crank pins. The main shaft 18 of this latter embodiment has secured thereto the master or bull reduction gear 21, and is adapted to be journaled on the bearings 5 which latter are suitably disposed in the crank case heads 6. Each of the pair of crank bearing rings 1 of this latter embodiment consists of, an annular shaped main body portion which is adapted to be supported on and guided by a plurality (preferably four) of equally spaced auxiliary crank shafts 7, a multitude of auxiliary connecting rods 8 oscillatably mounted in the periphery of said main body portion, and to have integral therewith an internal ring gear 22 formed in the inner circumference of said main body portion. In this particular embodiment illustrated, for each revolution of the auxiliary crank shafts 7 the main shaft 18 is rotated one-fourth revolution, this being due to the fact that the reduction gear ratio between the internal gears 22 and master gear 21, in this particular instance, is four to one. With this latter type of reduction gear combination, the diameter of the pitch circle of the internal ring gear 22, minus the diameter of the pitch circle of the master or bull reduction gear 21, should equal the individual throw of the auxiliary crank shafts 7 and the movement of the pistons at the outer ends of the connecting rods 8. In the form of a formula for this latter type of embodiment, the number of teeth in the internal gear 22, minus the number of teeth in the master or bull reduction gear 21, is equal to the number of teeth the gear 21 will rotatively advance per each revolution of the auxiliary crank shafts 7. For example, if the number of the teeth in the gear 21 be one-half the number of teeth in the gear 22, then the speed of rotation of the auxiliary crank shafts 7 and the main shaft 18 will be the same, but their direction of rotation will be opposite.

The manner of obtaining the correct reduction gear combination, of the third embodiment, is plainly illustrated by the diagrammatic Figs. 5 to 7 inclusive, wherein the circles 23 represent various sizes of pitch circles of the ring gear 21; the circles 24 represent various sizes of pitch circles of the ring gear 22; the vertical lines 25 represent the extent of crank throw of the individual shafts 7; the arrows 26 represent the rotative advance of the gear 21 for each one-quarter revolution of the shafts 7; and, the arrows 27 represent the rotative advance of the gear 21 per each revolution of the shafts 7. However, in the embodiment shown in Figs. 3, 4, and diagrammatic views 5, 6 and 7, the relation of the piston stroke and the throw of each of the crankshafts 7 to the pitch diameters of the intermeshing gear teeth on 1 and 21 must be such as to maintain the intermeshing of said teeth at a point which progresses about the periphery of the external gear 21 as the ring 1 moves thereabout in the path maintained by the crankshafts 7. With further reference to Figs. 5 to 7 inclusive and in connection with the third embodiment, it is apparent that when the diameter of the pitch circle 23 of the gear 21 is exactly one-half the diameter of the pitch circle 24 of the gear 22 (as diagrammatically illustrated in Fig. 6) that the speed of the main shaft 18 and auxiliary crank shafts 7 will be equal, and that a greater difference between the diameters of the pitch circles of said gears (as represented in Fig. 7) would cause said shaft 18 to rotate faster than said shafts 7 and vice versa.

In the embodiments described, the rings 1 are guided and controlled (in their paths of travel) by the auxiliary crank shafts 7 so as to place the pistons, attached to the connecting rods 8, on their respective dead centers of travel at the proper rotative period of travel of said shafts 7. The plurality of rings 1 are provided where it is desired to have the engine cylinders arranged in different rows. In the embodiment illustrated in Figs. 1 and 2, the control of the pair of rings 1 (in their paths of travel) is acquired and their coordination is maintained by the combined efforts of the opposed pair of crank pins 9 of each of the plurality of auxiliary crank shafts 7 and the meshing of the pinion gear portions 17 of the latter with the master gear 19, and in the embodiment illustrated in Figs. 3 and 4, the control of the pair of rings 1 (in their paths of travel) is attained and their coordination is maintained by the combined efforts of the opposed pair of crank pins 9 of each of the plurality of auxiliary crank shafts 7 and the meshing of the internal teeth 22 of said pair of rings with the master gear 21.

Each of the embodiments described in the foregoing and illustrated in the accompanying drawings represent different scopes of my invention and have their own distinct qualities. The invention is especially adaptable to large two stroke and other cycle oil engines wherein it may be desirable to install the oil atomizer operating and other cams directly on the shaft 18, and wherein a fairly high main shaft speed is not objectionable such as a direct drive means for an electric generating unit; and different gear ratios between shaft 18 and rings 1 are favorably adaptable to large oil engines, especially those of the two stroke cycle type that are equipped with an automatic oil atomizing and injecting system and wherein no mechanical valve operating mechanism is necessary, also in which no particular relation in speed between the shafts 7 and shaft 18 is essential, and wherein an increase or decrease in the speed of the shaft 18 in relation to the shafts 7 is desirable, such as a decrease in the speed of the main shaft 18 for direct drive purposes in connection with the propulsion of marine and aeronautical vessels. When either of the embodiments illustrated in Figs. 1 to 4 inclusive are to be used in connection with a four stroke cycle internal combustion engine, it is recommended (that when possible) that the speed of the shaft 18 be one half of that of the shafts 7 so that the various valve operating cams, of such an engine, may be mounted directly on and rotated with said main shaft 18.

The foregoing structure in each of its illustrated types avoids the essential of the prior art of having one of the connecting rods 8 rigidly connected to its ring 1 in order to control the relative position of said ring and which control substantially tends to subject the piston and cylinder associated with such rod to greater lateral wear and to readily develop piston slap. This objectionable condition is obviated by my invention by independently controlling the relative position of each ring 1 required in the engine design and construction. Furthermore, said independent control of each ring 1 enables the adaptation of each such ring to drive the main shaft of the engine at a lower, the same, or a higher speed, as may be desired, through an intermediate gear train including at least one eccentric gear.

These advancements in the art with their simplicity, durability, efficiency and adaptability to the requirements of different types of engines and the like substantially characterize my invention.

The rings 1, and the crank-shaft 7—9—17, are readily replaceable in their assemblies and are adapted to be separately made and kept on hand for such contingency.

The invention herein described may be manufactured and used by or for the Government of the United States of America for governmental purposes without the payment to me of any royalty thereon or therefor.

Having fully described my invention, what I claim as new and desire to secure by Letters Patent is:

1. In a radial connecting rod assembly the combination of a plurality of reciprocable connecting rods, a member eccentric to the hereinafter stated shaft and provided with means adapted to pivotally connect thereto each connecting rod to be associated therewith for applying power thereto, a relatively stationary element, a plurality of crankshafts spaced about the member, each of said crankshafts having a journal and a crank pin, one of which having a bearing in said member and the other of which having a bearing in said element, a shaft independent of said crankshafts, and means including two intermeshing toothed gears, one of which is fixed to said shaft, the other of which gears comprises a web of one of the crankshafts eccentric to the axis of its crank pin, whereby the reciprocating power applied to said member by said connecting rods is transformed into rotary motion of said shaft, said connecting rods, member and gears being in substantially the same plane.

2. In a radial connecting rod assembly for multiple cylindered radial engines the combination of a plurality of reciprocable connecting rods, a shaft, an annular ring eccentrically encircling said shaft and provided about its periphery with spaced apart means adapted to pivotally connect thereto said connecting rods which impart power thereto, internal gear teeth disposed on the inner surface of said ring, an external toothed gear fixed on said shaft and adapted to mesh with said internal gear teeth, and means for limiting the movement of said ring to rotary motion in its eccentric path and maintaining the intermeshing of the teeth of said gears; whereby the reciprocating power transmitted to said ring by said connecting rods is transformed into rotary motion to said shaft, said connecting rods, ring and gear being in substantially the same plane.

3. In a radial connecting rod assembly for multiple cylindered radial engines, the combination of a shaft, an annular ring eccentrically encircling said shaft and provided about its periphery with spaced apart means adapted to pivotally connect thereto reciprocating connecting rods for imparting rotary motion to said ring, internal gear teeth disposed on the inner surface of said ring, an external toothed gear fixed on said shaft and adapted to mesh with said internal gear teeth, a relatively rigid element, and a plurality of crankshafts spaced about said ring and having opposite crank pins respectively provided with bearings in said ring and element for controlling the path of rotation of said ring and maintaining the intermeshing of said gear teeth, whereby the motion so imparted to said ring is transformed into rotary motion of said shaft, said connecting rods, ring and gear being in substantially the same plane which is transverse to the longitudinal axis of said shaft.

4. In a radial connecting rod assembly for multiple cylindered engines, the combination of a plurality of connecting rods, an annular ring eccentrically encircling the first hereinafter stated gear and provided with spaced apart bearings for connecting thereto the adjacent ends of said rods, a plurality of crankshafts spaced about said ring and having portions thereof provided with bearings in said ring and the hereinafter stated frame for maintaining the eccentricity of said ring, a shaft separate from said crankshafts and having an external toothed gear fixed thereon, a frame having bearings for said shaft, and a second external toothed gear whose teeth intermesh with the teeth of said first gear and fixed to and comprising the web of one of said crankshafts, there being such relation of the intermeshing toothed surfaces of said gears as will maintain the intermeshing of the teeth of said gears.

5. The combination in a radial connecting rod assembly for radial engines whose cylinders are in a row, or rows, of a plurality of connecting rods, a plurality of spaced apart annular rings eccentrically encircling the first hereinafter stated gear and each provided with spaced apart bearings for connecting thereto the adjacent ends of selected ones of said rods, a plurality of crankshafts spaced about said rings, means whereby said crankshafts maintain the eccentricity of said rings, a shaft separate from said crankshafts and having an external toothed gear fixed thereon, a frame having bearings for said shaft, and a second external toothed gear whose teeth intermesh with the teeth of said first gear and fixed on one of said crankshafts, there being such relation of the intermeshing toothed surfaces as will maintain the intermeshing of the teeth of said gears.

6. In a radial connecting rod assembly for multiple cylindered radial engines, the combination of a shaft, an annular ring eccentrically encircling said shaft and provided about its periphery with spaced apart means adapted to pivotally connect thereto reciprocating connecting rods for imparting rotary motion to said ring, internal gear teeth disposed on the inner surface of said ring, an external toothed gear fixed on said shaft and adapted to mesh with said internal gear teeth, a relatively rigid element, and a plurality of crankshafts spaced about said ring and having opposite crank pins respectively provided with bearings in said ring and element for controlling the path of rotation of said ring and maintaining the intermeshing of said gear teeth; the relative diameters of the internal and external gears being such as to produce the desired ratio of transmission between said gears; and the throw of said crankshafts and the extent of reciprocation of said connecting rods being in definite relation to the difference in diameters of the internal and external gears; whereby motion by said connecting rods to said ring is transformed into rotary motion of said shaft and said gears maintained in mesh.

7. In a radial connecting rod assembly the combination of a shaft, a gear fixed to said shaft, a bearing ring encircling said shaft and gear and provided with connecting rod bearings, a gear eccentrically fixed on said ring relative to and intermeshing with said first gear, and means for limiting the movement of said ring to the definite path which will maintain the intermeshing of said gears.

8. In a radial connecting rod assembly the combination of a shaft, a gear fixed to said shaft, a bearing ring encircling said shaft and provided with connecting rod bearings, a plurality of gears eccentrically and revolubly mounted on said ring and intermeshing with said first gear, and means for limiting the movement of said ring to the definite path which will maintain the intermeshing of said gears.

9. In a radial connecting rod assembly the combination of a shaft, a gear fixed to said shaft, a bearing ring encircling said shaft and provided with connecting rod bearings, a relatively stationary element, and a gear meshing with said first gear and provided with oppositely located crank pins respectively bearing in said ring and said element.

10. In a radial connecting rod assembly the combination of a shaft, a gear fixed to said shaft, a bearing ring encircling said shaft and provided with connecting rod bearings, a relatively stationary element, and a plurality of gears meshing with said first gear and each provided with oppositely located crank pins respectively bearing in said ring and said element.

11. In a radial connecting rod assembly the combination of a shaft, a gear fixed to said shaft, a plurality of bearing rings encircling said shaft and each provided with connecting rod bearings, a relatively stationary element adjacent the outer side of each of said rings, a plurality of gears intermediate each ring and its adjacent element and meshing with said first gear and each provided with an oppositely projecting crank pin and bearing respectively bearing in the adjacent ring and element, and a second plurality of gears intermediate said rings and meshing with said first gear and each provided with oppositely located crank pins respectively bearing in said adjacent rings.

12. The connecting rod assembly for radial engines of claim 7 characterized by the relative diameters of said gears being such as to produce the desired ratio of transmission between said gears.

13. In a mother crank bearing assembly for radial engines, the combination of a plurality of connecting rods, a shaft, at least one member cooperating with the shaft and provided with means to which the crank ends of selected connecting rods are pivoted at separated points about said member, means for confining the movement of said member to a rotary reciprocating motion, and second means for drivingly connecting the member and shaft for rotating the shaft by said motion of the member, said second means comprising a train of intermeshing toothed gear means of which one is fixed to the shaft, and of which another gear means is connected to one of a pair of elements comprising the member and the first stated means, and the teeth of said last mentioned gear having an eccentricity corresponding to the extent of the reciprocating motion of said member.

14. The combination of claim 13 characterized by the means for confining the movement of said member to a rotary reciprocating motion comprising a plurality of auxiliary crank shafts having bearings in said member and a portion of a frame operatively supporting the elements hereof.

15. The combination of claim 13 characterized by a plurality of members to each of which the crank ends of selected connecting rods are pivoted and by the eccentric gear means being a plurality of such eccentric gears, at least one for each member, and the eccentric gear of one member being staggered relative to the eccentric gear for the other member.

FRANK DAVID BUTLER.